United States Patent [19]
Crowe

[11] Patent Number: 5,161,976
[45] Date of Patent: Nov. 10, 1992

[54] ALPHABET TEACHING AND LEARNING GAME AND METHOD THEREOF

[76] Inventor: James E. Crowe, P.O. Box 541453, Merrit Island, Fla. 32954

[21] Appl. No.: 816,377

[22] Filed: Dec. 27, 1991

Related U.S. Application Data

[63] Continuation-in-part of Ser. No. 513,971, Apr. 24, 1990, Pat. No. 5,092,777.

[51] Int. Cl.$^5$ .............................................. G09B 19/22
[52] U.S. Cl. ..................................... 434/159; 273/302
[58] Field of Search ............... 434/129, 156, 159, 170; 273/302, 299; D21/46

[56] References Cited

U.S. PATENT DOCUMENTS

| | | | |
|---|---|---|---|
| 21,798 | 12/1858 | Hill | 434/159 |
| D. 56,985 | 1/1921 | Moore | D21/46 |
| 1,076,307 | 10/1913 | Nicholson | 273/299 |
| 1,477,255 | 12/1923 | Fritz | 434/159 |
| 1,485,146 | 2/1924 | Mundell | 434/159 X |
| 1,514,595 | 11/1924 | Thomson | 434/159 X |
| 1,841,369 | 1/1932 | Freeman | 434/159 |
| 2,581,595 | 1/1952 | Miodaski et al. | 434/170 |
| 3,817,206 | 5/1974 | Gacetta | 434/159 |
| 3,858,333 | 1/1975 | Kopp | 434/156 X |
| 4,188,734 | 2/1980 | Rich | 35/35 H |
| 4,192,513 | 3/1980 | Feeley et al. | 273/302 X |
| 4,950,165 | 8/1990 | Machaalani | 434/159 |
| 5,092,777 | 3/1992 | Crowe | 434/159 |

FOREIGN PATENT DOCUMENTS

| | | | |
|---|---|---|---|
| 375484 | 6/1932 | United Kingdom | 273/152 |
| 890170 | 11/1989 | World Int. Prop. O. | 273/299 |

*Primary Examiner*—John J. Wilson
*Assistant Examiner*—L. Thomas
*Attorney, Agent, or Firm*—Leonard Bloom

[57] ABSTRACT

A teaching and learning game for players to learn the sequence of letters in the alphabet. In a preferred embodiment, a set of fifty cards comprising two groups of twenty-five cards each are provided. The first side of one group has marked thereon a respective letter of the alphabet and first indicia to indicate the succeeding letter of the alphabet such that the players are directed to identify the letter of the alphabet which succeeds the letter marked on the first side of the card. The first side of the second group has marked thereon a respective letter of the alphabet and second indicia to indicate the preceding letter of the alphabet such that players are directed to identify the letter of the alphabet which precedes the letter marked on the second side of the card. The second side of the card has third indicia marked thereon to direct the players and to further teach the players the relation between the third indicia and the letters of the alphabet. A set of instructions is also provided. A method of playing the game is disclosed.

22 Claims, 14 Drawing Sheets

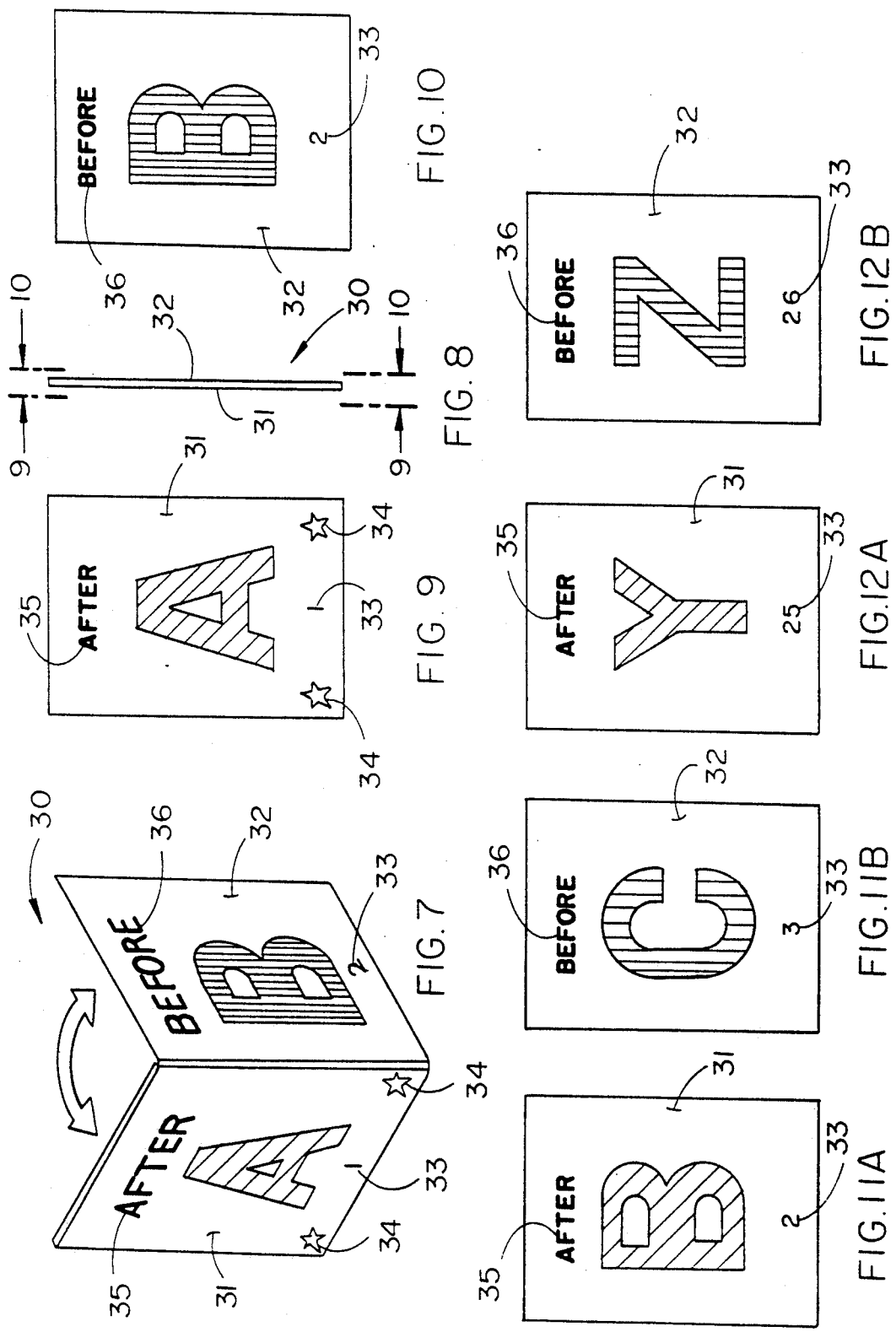

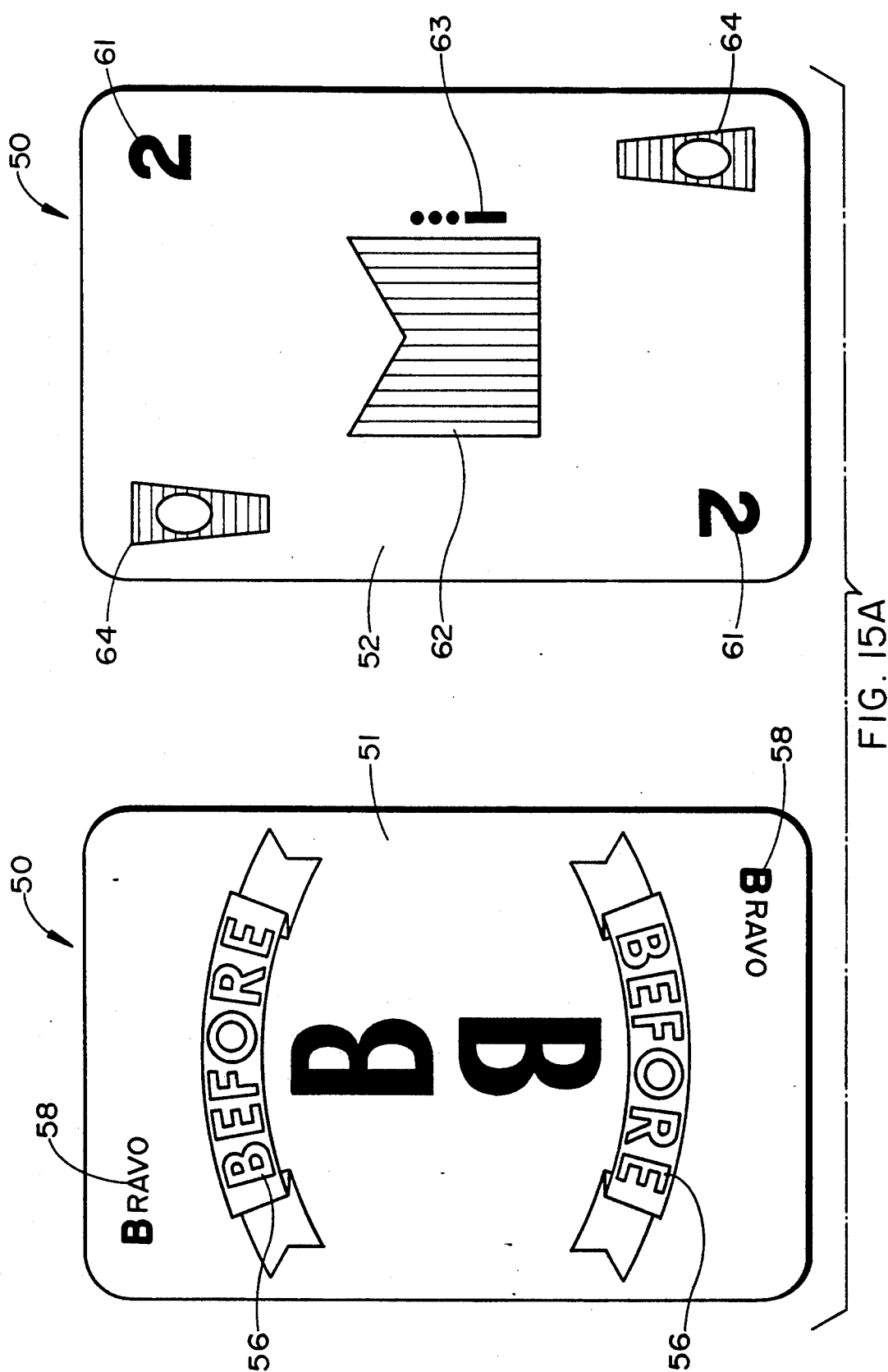

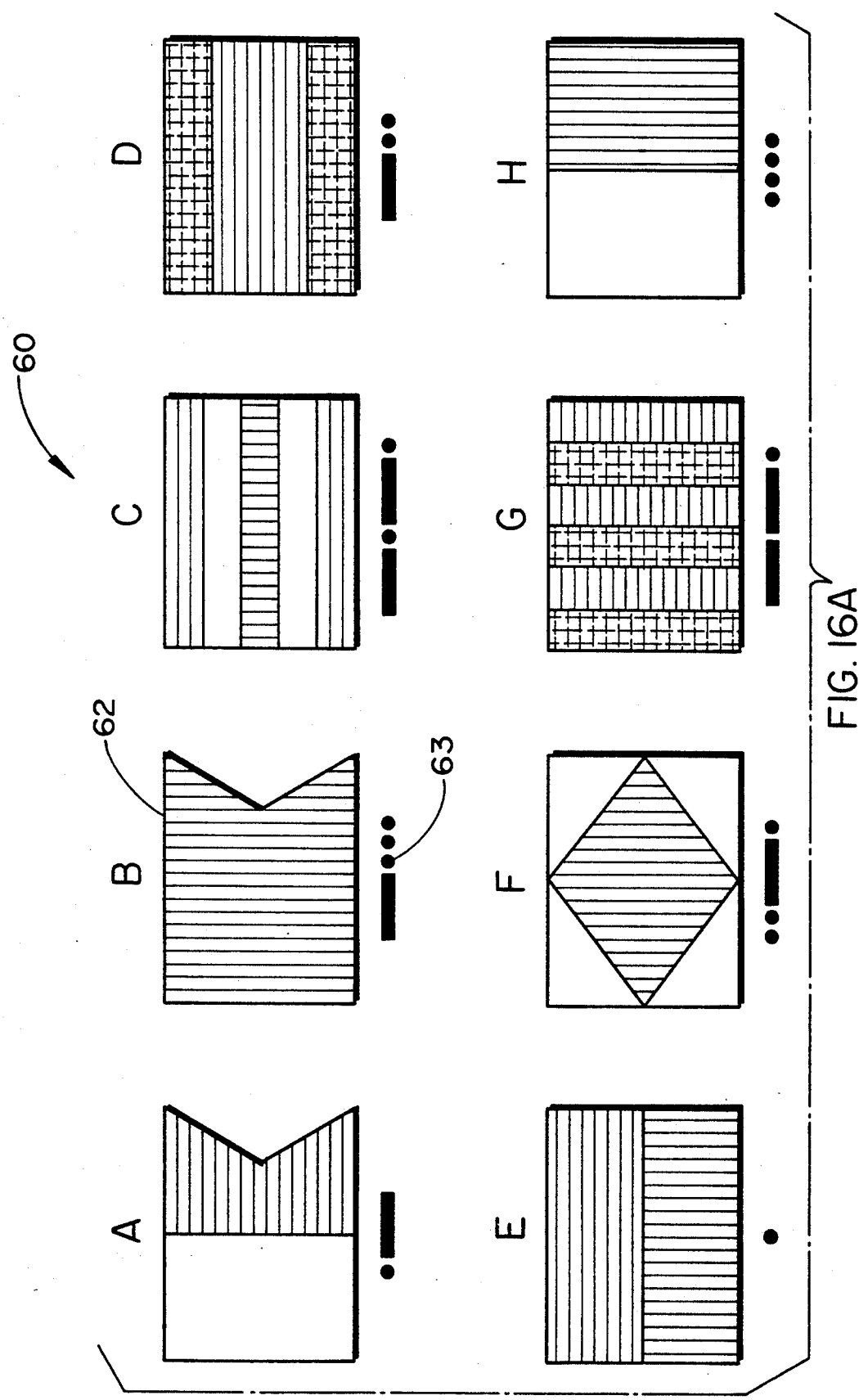

ALPHABET TEACHING AND LEARNING GAME AND METHOD THEREOF

CROSS-REFERENCE TO RELATED APPLICATION

This application is a continuation-in-part of co-pending application Ser. No. 513,971 filed Apr. 24, 1990, now U.S. Pat. No. 5,092,777, the disclosure of which is incorporated by reference herein in its entirety.

FIELD OF THE INVENTION

The present invention relates to teaching and learning games for players to learn the sequence of letters in the alphabet.

BACKGROUND OF THE INVENTION

Many recent studies have highlighted the poor reading ability of a disturbingly high percentage of the population, both children and adults. Efforts are being made by government agencies and education groups to improve the reading and literacy of the general public. One of the fundamentals of reading is a thorough knowledge of the alphabet.

One approach to correcting this serious problem is to teach the alphabet by means of a game. Examples of alphabet blocks can be found in U.S. Pat. No. 21,798 issued to Hill and U.S. Pat. No. 1,477,255 issued to Fritz. Both of these disclose a block having five different letters of the alphabet and a numeral on the separate sides of the block. U.S. Pat. No. 3,811,206 issued to Gacetta discloses a board having raised numbers affixed to the upper surface and a set of twenty-six movable blocks marked to represent each letter of the alphabet. The blocks have an under surface which is recessed to mate with the number which corresponds to its sequence in the alphabet.

Playing cards have also been used in teaching the alphabet as disclosed in U.S. Pat. No. D 56,985 issued to Moore and U.S. Pat. No. 4,192,513 issued to Feeley et al. The former discloses a deck of cards, each card having a separate letter of the alphabet displayed in upper case and lower case and a drawing of an object, the name of which is spelled with the first letter thereof being the letter displayed on the specific card. The latter discloses a card game which has a three letter natural alphabetical sequence. The second letter of the sequence is also imprinted in the upper and lower corners of the diamond shaped playing card. The cards also indicate a suit (spades, clubs, hearts or diamonds) and there are 26 cards in each suit. The reverse side of the card has a pattern design and is not imprinted with letters of the alphabet.

Despite these devices being available for many years, they are not widely used and the education problem is still a major one. Furthermore, the cited references do not present a technique to facilitate learning the alphabet as an orderly sequence to determine the letters preceding and succeeding one another.

The alphabet teaching and learning game disclosed by the applicant in the parent application of which the present application is a continuation-in-part, does provide such an orderly sequence. However, further improvements can be made to present additional techniques for learning the alphabet and designators which are related to the alphabet.

SUMMARY OF THE INVENTION

Accordingly, it is the primary object of the present invention to provide an entertaining and educational game which facilitates learning of the alphabet.

It is another object of the present invention to provide a game which encourages the players to learn the alphabet in such a manner that the player can identify the letter which precedes and the letter which succeeds any selected letter of the alphabet.

It is yet another object of the present invention to provide a set of cards, each having a selected letter of the alphabet marked thereon, and further having indicia marked thereon for the card players to indicate the letter preceding and the letter succeeding the letter displayed on the card.

It is a further object of the invention to provide a set of cards, each having two sequential letters of the alphabet marked thereon, and further having a numeral on each card, the numeral corresponding with the numerical sequence in alphabetical order of the letter marked on the specific card.

It is a yet further object of the present invention to provide a method of playing an educational game to assist persons in learning the alphabet and the sequence of letters of the alphabet.

It is still a further object of the present invention to provide a set of cards having three indicia means marked thereon to enable players to learn the letters succeeding and preceding a selected letter of the alphabet and also to learn additional means of identifying the letters of the alphabet.

In accordance with the teachings of the present invention, there is disclosed a teaching and learning game of cards to be used by at least two players to learn the alphabetical sequence of letters of the alphabet. A set of fifty cards is provided, each card having a first side and a second side. The first side of each card has marked thereon a single letter of the alphabet. The first side of a first group of twenty-five of said cards has marked these on a respective letter of the alphabet indicating the letters A through Y. Further marked on the first side of the first group of cards are first indicia means to indicate the succeeding letter such that the players are directed to identify the letter of the alphabet which succeeds the letter marked on the first side of said card. The first side of a second group of twenty-five of said cards has marked thereon a respective letter of the alphabet indicating the letters B through Z. Further marked on the first side of the second group of cards are second indicia means to indicate the preceding letter such that players are directed to identify the letter of the alphabet which precedes the letter marked on the first side of said card. The second side of each card further has marked thereon third indicia associated with the respective letters of the alphabet. A set of instructions is provided for the use of the cards such that the players may compete to be the first player to properly identify the letter of the alphabet as directed by indicia means marked on the selected card. In a preferred embodiment, the first indicia means for the succeeding letter is the notation "after" and the second indicia means for the preceding letter is the notation "before". The third indicia means is a number on the second side of each card. Each number corresponds with the numerical sequence in alphabetical order of the letter of the alphabet marked on the first side of the respective card. Alternately, the third indicia means is a Morse code designator. The Morse code designator corresponds with the letter of the alphabet marked on the first side of the respective card. In another embodiment, the third indicia means is the marking of an international code flag, said flag marking corresponding with the letter of the alphabet marked on the first side of the respective card. In yet another embodiment, the third indicia means is the marking of an international numeral code pennant, said pennant marking corresponding with the numerical sequence in alphabetical order of the letter of the alphabet marked on the first side of the respective card.

These and other objects of the present invention will become apparent from a reading of the following specification, taken in conjunction with the enclosed drawings.

BRIEF DESCRIPTION OF THE DRAWINGS

FIG. 7 is a perspective view of the card of the game of the present invention on which are marked the initial letters of the alphabet showing the opposite sides of the same card.

FIG. 8 is an end view of the card of FIG. 7.

FIG. 9 is a plan view of the card of FIG. 8 taken along the lines 9—9 to show one side of the card.

FIG. 10 is a plan view of the card of FIG. 8 taken along the lines 10—10 to show the opposite side of the card.

FIG. 11A is a plan view of a card of the game next succeeding the card of FIG. 7.

FIG. 11B is a plan view of the opposite side of the card of FIG. 11A on which is marked the succeeding letter of the alphabet.

FIG. 12A is a plan view of one side card of the game on which are marked the next to the last letter of the alphabet.

FIG. 12B is a plan view of the opposite side of the card of FIG. 12A on which is marked the last letter of the alphabet.

FIG. 15A is a plan view showing both sides of a representative card of another embodiment.

FIGS. 16A–16D are the flags representing the international code of signals and the Morse code designators of the letters of the alphabet used as third indicia means.

DESCRIPTION OF THE PREFERRED EMBODIMENTS

Figure 1:
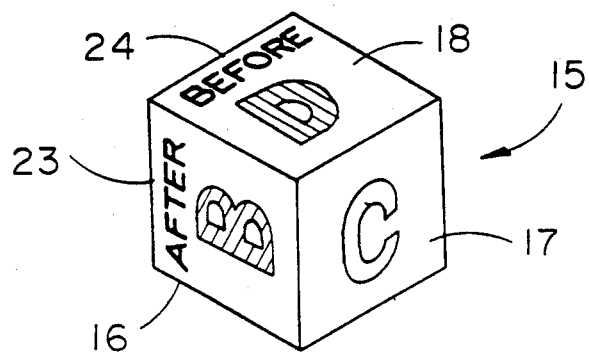
FIG. 1 is a perspective view of the one block of the block game of the present invention showing three sides of the block.

The games of the present invention may be used by persons of any age from pre-school to adult to assist in teaching and the rapid learning of the alphabet and of the sequence of letters in the alphabet. In particular, the games facilitate learning the alphabet so that the player can recognize the letters preceding and succeeding the letter displayed in the game.

Referring now to the drawings, FIGS. 1-4 show typical blocks of the block game. There are thirteen blocks in the game which are approximately 1½ inches square but may be of any desired size. The blocks may be made of wood, plastic or any suitable material and may have rounded or square corners or edges. Each individual block 15 has six sides.

Figure 2:
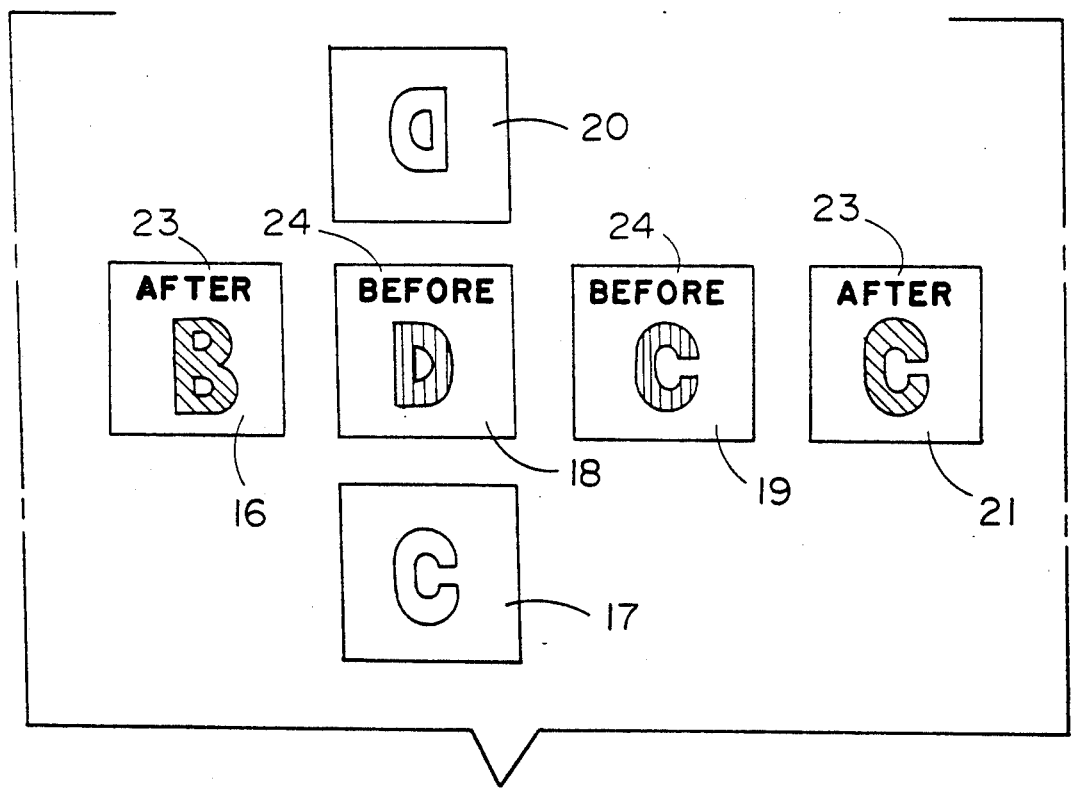
FIG. 2 is a laid out view of the block of FIG. 1 showing all the sides thereof.
Figure 2A:
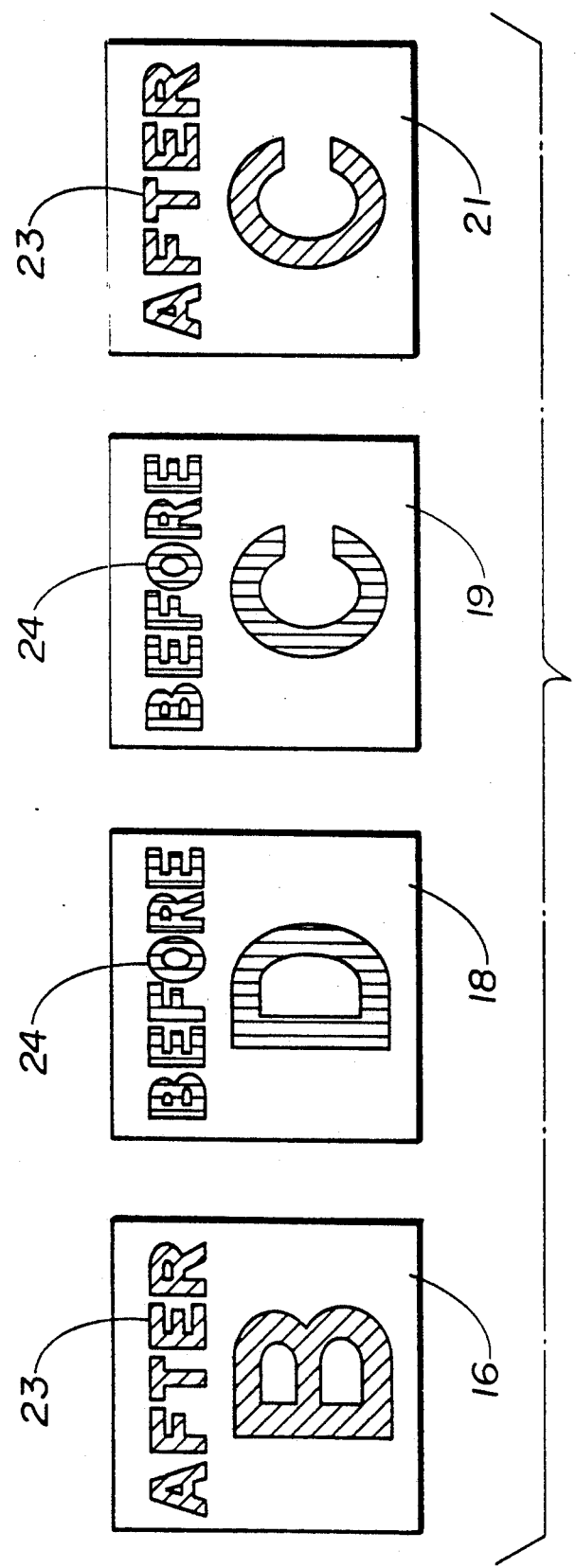
FIG. 2A is an enlarged view of a portion of the block of FIG. 2 showing the indicia marked to indicate color coding.
Figure 3:
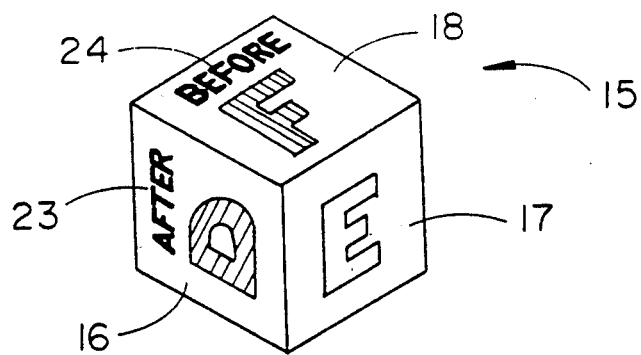
FIG. 3 is a perspective view of the block next succeeding the block of FIG. 1 showing three sides of the block.
Figure 4:
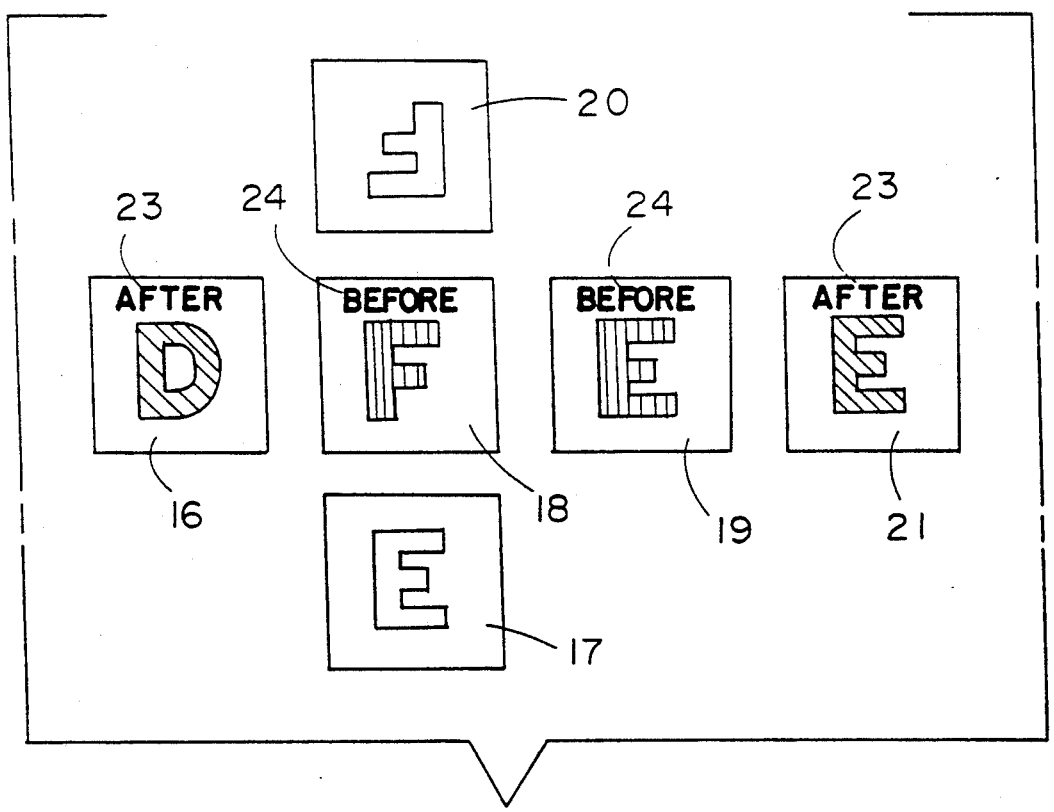
FIG. 4 is a laid out view of the block of FIG. 3 showing all of the sides thereof.

On twelve of the blocks 15, the letters of the alphabet are marked as the respective sides by paint, decals, molding or any desired method the letters being planar, raised or depressed as desired. The sequence of marking is as shown. A first side 16 has a letter of the alphabet marked thereon. Also marked on the first side 16 of the block 15, there is a second indicia means 23 to indicate the succeeding letter to the letter of the alphabet marked on the first side 16. As shown in FIGS. 1-4, this may be the notation "AFTER". Other indicia means 23 such as color coding may be used, as for example, for persons who are unable to read the written notation. A single indicia means or multiple indicia means may be used as desired. FIGS. 1, 2 and 2A show the color code (for example, green for "succeeding" and red for "preceding") applied to the letters on the sides of the block 15, but the color may be applied to the entire side, part of the side or in any manner desired. On the fourth side 19 of the block 15, which is opposite to the first side 16, there is marked the letter of the alphabet which immediately or next succeeds the letter marked on the first side 16 of the same block 15. Thus, as shown in FIG. 2, the letter "B" is marked on the first side 16 and the letter "C" is marked on the fourth side 19. Similarly, in FIG. 4, the letter "D" is marked on the first side 16 and the letter "E" is marked on the opposite, fourth side 19. Further, the fourth side 19 also has marked thereon first indicia means 24 to indicate the preceding letter. Thus, FIGS. 2 and 4 show the notation "BEFORE" on the fourth side 19. Also, in FIGS. 2 and 2A, the letter "B" on the first side 16 is shown to be color coded green as the second indicia means 23 and the letter "C" on the fourth side 19 is shown to be color coded red as the first indicia means 24. The second side 17 of the block 15 has marked thereon the letter of the alphabet which succeeds the letter of the alphabet marked on the first side 16. Accordingly, the second side 17 in FIGS. 1 and 2 is marked with a "C" and the second side 17 in FIGS. 3 and 4 is marked with an "E". The fifth side 20 of each block 15, opposite from the second side 17, has marked thereon the letter of the alphabet next succeeding the letter marked on the second side 17. Thus, FIG. 2 shows the letter "D" on the fifth side 20 and FIG. 4 shows the letter "F" on the fifth side 20. The third side 18 has marked thereon the same letter as is marked on the fifth side 20. Thus, FIGS. 1 and 2 show the letters "D" on the third side 18 and FIGS. 3 and 4 show the letter "F" on the third side 18. Further, the third side 18 also has marked thereon first indicia means 24 to indicate the preceding letter. The third side 18 has the notation "BEFORE" and in FIGS. 1, 2 and 2A, the letter "D" is shown in red as the first indicia means 24. A sixth side 21, opposite to the side 18, has marked thereon the same letter of the alphabet as is marked on the second side 17. Thus, FIGS. 2 and 4 show the letters "C" and "E" respectively on the sixth side 21 thereof. Further, the sixth side 21 of each block 15 has marked thereon second indicia means 23 indicating the succeeding letter. As shown in FIGS. 2 and 4, the notation "AFTER" is marked on the sixth side 21 and the letter "C" on the sixth side 21 of FIG. 2 is color coded green. The markings on the separate blocks 15 are alphabetically sequential such that the letters on the second side 17 and the third side 18 of separate blocks 15 designate the letters of the alphabet from "B" through "Z". As is shown in FIGS. 2 and 4, the letters respectively are "C", "D" and "E", "F". Similarly, other blocks in the set have marked on their respective second side and third side the letters "G", "H" and "I", "J" and continuing. In this manner, each block has marked thereon three different letters of the alphabet and the twelve blocks have marked thereon the twenty-five letters from "B" through "Z".

Figure 5:
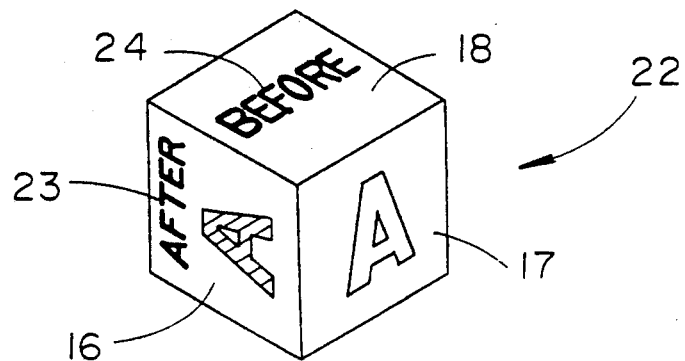
FIG. 5 is a perspective view of the first block of the set of the block game of the present invention showing three sides of the block.
Figure 6:
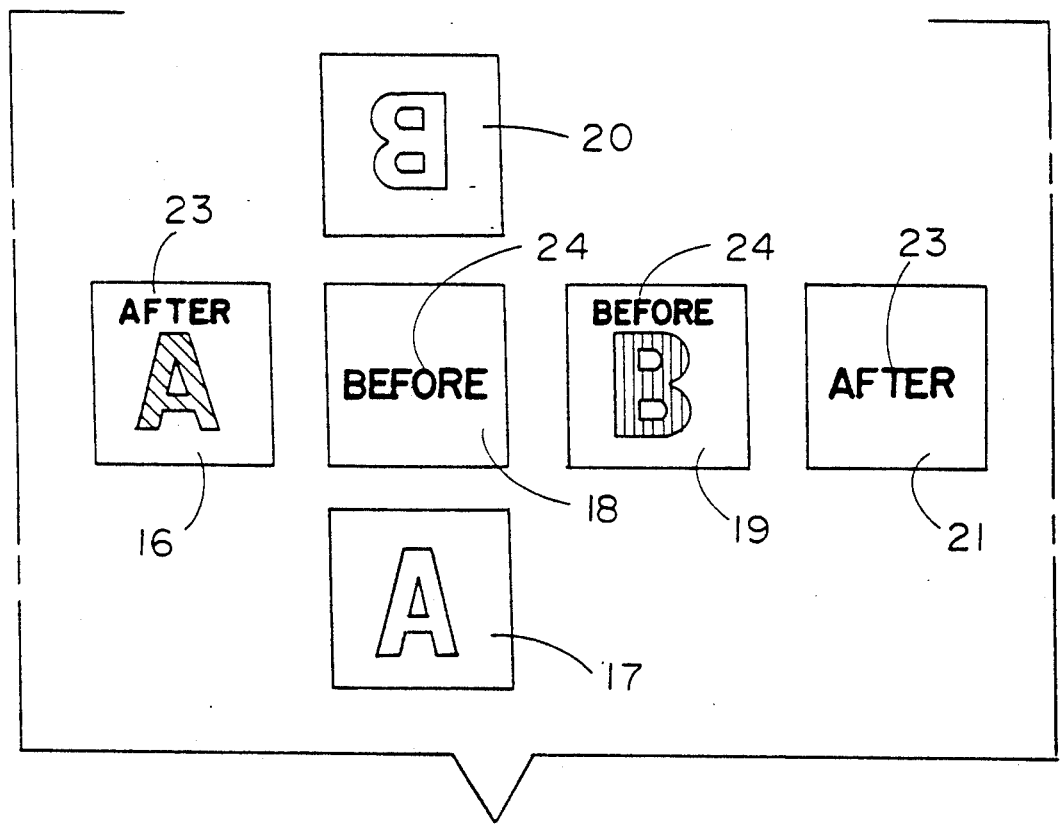
FIG. 6 is a laid out view of the block of FIG. 5 showing all the sides thereof.

Referring to FIGS. 5 and 6, the thirteenth block 22 has marked on the first side 16, the letter "A" and further has marked on the first side second indicia means 23 to indicate the succeeding letter. The notation "AFTER" and the letter color coded green are shown in FIG. 5 in a manner similar to FIG. 2A. The fourth side 19, opposite to the first side 16, has marked thereon the letter "B" and further has marked thereon first indicia means 24 to indicate the preceding letter. FIG. 6 shows the notation "BEFORE" on the fourth side 19. The second side 17 has marked thereon the letter "A". The fifth side 20, opposite to the second side 17, has marked thereon the letter "B". The third side 18 has marked thereon the first indicia means 24 to indicate preceding and is marked "BEFORE". The sixth side 21, opposite to the third side 18 has marked thereon the second indicia means 23 to indicate succeeding and is marked "AFTER".

The game may be played by one to eight persons. Two sets of blocks are recommended for more than four players. The game is played by placing the blocks 15 on a flat surface such as a table with the side of the block 15 having an indicia means 23, 24 facing upwardly. One player, who is selected to initiate the game, indicates one of the blocks. The player to first identify the preceding or succeeding letter of the alphabet (as required by the indicia means on the selected block) is assigned one point. The block 15 which had been selected is now rotated such that a different side of said block 15 having an indicia means is facing upwardly. Another block is identified and the above is repeated until one player accumulates a predetermined number of points, such as 26 points. The first player to accumulate these points becomes the winner.

In another preferred embodiment, the game is a card game to be used by at least two players and as many as four players. A set (or deck) of twenty-five cards 30 are provided. The cards 30 may be of any convenient size such as three inches by five inches and may be made of any desired material. Conventional playing card material or plastic may be used. As shown in FIGS. 7–12B, the cards 30 have a first side 31 and a second side 32. The first side 30 of each card has marked thereon a letter of he alphabet and further has marked thereon a second indicia means 35 to indicate the succeeding letter of the alphabet. The second side 32 of each card has marked thereon the letter of the alphabet next in sequence after (succeeding) the letter of the alphabet marked on the first side 31 of said card 30. The second side 32 of each card further has marked thereon first indicia means 36 to indicate the preceding letter of the alphabet. Thus, in FIGS. 7–10, the first side 31 has the letter "A" marked thereon and the second side 32 has the letter "B" marked thereon. In a similar manner, and as shown in FIGS. 11A–11B, another card 30 has marked on the first side 31, the letter "B" and second indicia means 35 to indicate the succeeding letter of the alphabet ("AFTER"). The second side 32 has marked thereon the letter "C" and first indicia means 36 to indicate the preceding letter of the alphabet ("BEFORE"). FIG. 12A and 12B show the card 30 which has marked thereon the letters "Y" and "Z" in a similar manner on the respective first side 31 and the second side 32. Further, each side of each card 30 has marked thereon a number 33, the number 33 corresponding with the numerical sequence in alphabetical order of the letter of the alphabet which is marked on the respective side of the respective card. Thus, as shown in FIGS. 7–11B, the side of the card 31 marked "A" has the corresponding number "1", the side of the card 32 marked "B" has the corresponding number "2", the side of the card 32 marked with the letter "C" has the corresponding number "3". FIG. 12A and 12B shows the letter "Y" with number "25" and the letter "Z" with the number "26". The indicia means 35, 36 may also be color coded as was described for the block game embodiment of the present invention. In a manner similar to FIG. 2A, the FIGS. 7, 11A, 11B and 12A–12B also are color coded red to represent the preceding first indicia means 36 and the color green to represent the succeeding second indicia 35 although any desired color code may be used. The cards 30 further have marked on selected cards, scoring indicia means 34 such as the star design shown in FIGS. 7 and 9. Other distinctive indicia means 34 may be used as desired. These scoring indicia means 34 provide bonus scoring points to the player who correctly identifies the succeeding or preceding letter as required.

Figure 13:
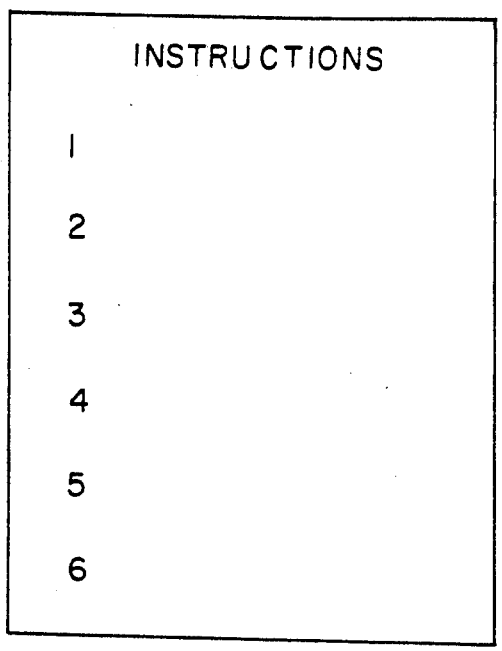
FIG. 13 is a plan view showing a card having the instructions of the card game printed thereon.

The game further has a set of instructions 37 which may be printed on a card 30 as shown in FIG. 13 or may be printed on a separate page or booklet as desired.

The card game is played by having one player displaying each card, one at a time and in sequence or randomly, to all of the players. The player who is the first to correctly identify the before or after letters (as required by indicia means on the displayed card), is awarded points. The displayed card is then placed in a discard stack. A suggested point system is based on one point for a consonant, two points for a vowel. The vowels, as denoted by the scoring indicia means 34, have two stars or similar distinctive marks. Further, if the player correctly identifies the preceding or succeeding letter's numerical position in the alphabet, an additional bonus point is awarded. The player having accumulated the greatest number of points after all the cards have been displayed is determined to be the winner. Of course, variations in the order of display of the cards and scoring procedures may be made.

Figure 14:
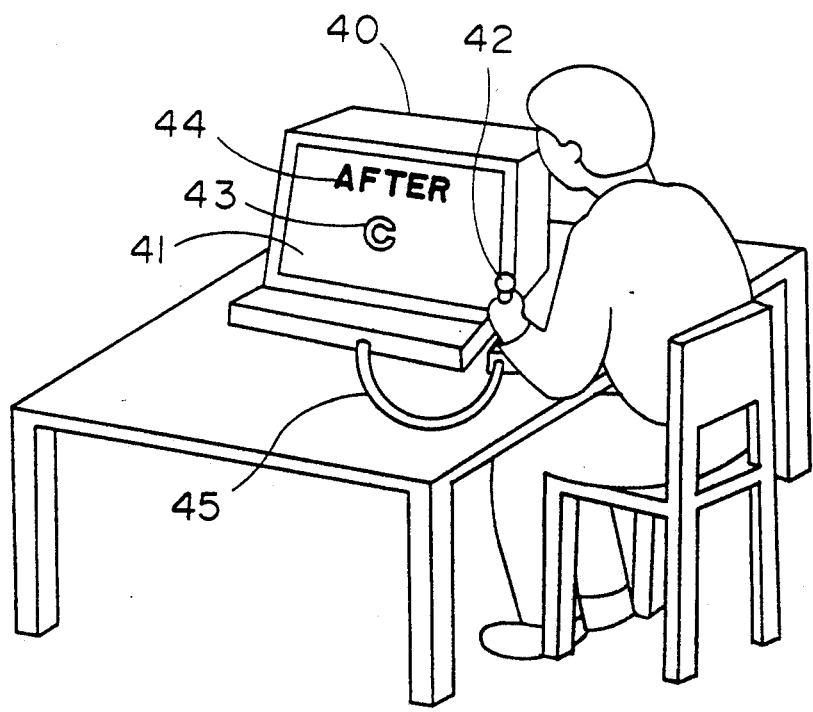
FIG. 14 is a perspective view showing a video game having an image of a letter of the alphabet with an indicia means displayed thereon.

In still another preferred embodiment, as shown in FIG. 14, the game is a video game 40 to be used by at least one player. A video screen 41 is provided on which there may be displayed a plurality of images. The images include a separate image 43 for each letter of the alphabet. A reader means 42, connected to the video screen 41 by a communicating means 45, enables the player to select an image 43 to be displayed on the screen. Also displayed on the video screen 41 is an indicia means 44 to indicate the preceding letter of the alphabet and the succeeding letter of the alphabet of the image 43 displayed. The indicia means 44 may be either for the preceding or the succeeding letter. The player identifies the letter as indicated by the indicia means 44, either preceding or succeeding. The indicia means 44 may be the notation "before" or "after" or may be a color code (as in FIG. 2A) or other means as desired. If the identification is correct, the player is awarded a point score. The accumulation of point scores is used to determine a winning player.

The game is played by the player, using the reader means 42, selecting an image 43 of a letter of the alphabet and selecting an indicia means 44 which are displayed on the video screen 41. The player, upon seeing the display, identifies the succeeding or preceding letter of the alphabet as indicated by the indicia means 44 displayed on the video screen 41. Points are awarded to the player for a correct identification. Also, if desired, additional points may be awarded for selected letters of the alphabet as indicated by scoring indicia means which are displayed on the video screen 41. A further display is a number which corresponds to the numerical sequence in alphabetical order of the letter which is displayed on the video screen 41. Additional players may play using the above procedure. The player with the largest accumulated point score is the winner of the game.

Figure 15B:
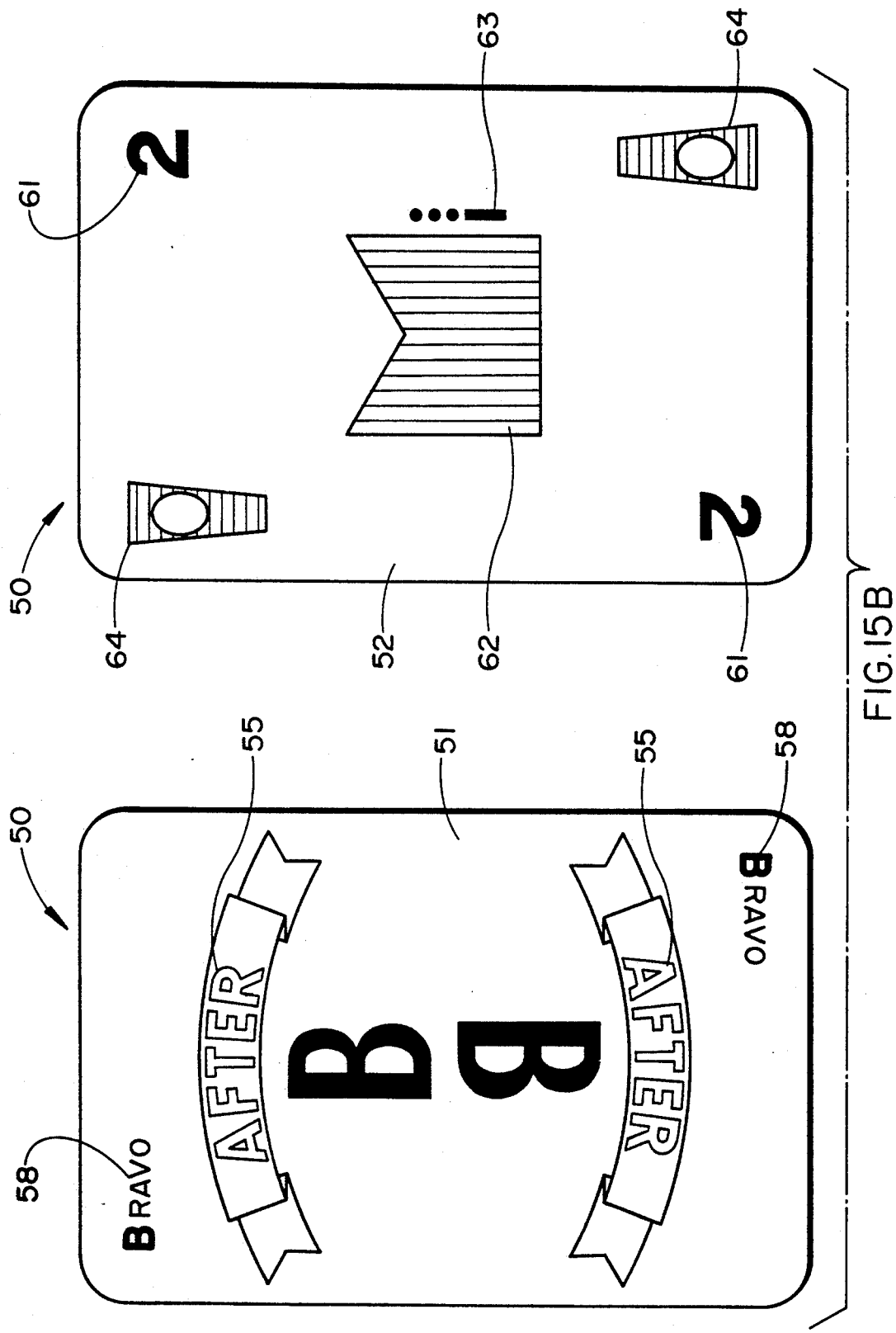
FIG. 15B is a plan view showing both sides of another representative card of the embodiment of FIG. 15A.
Figure 16B:
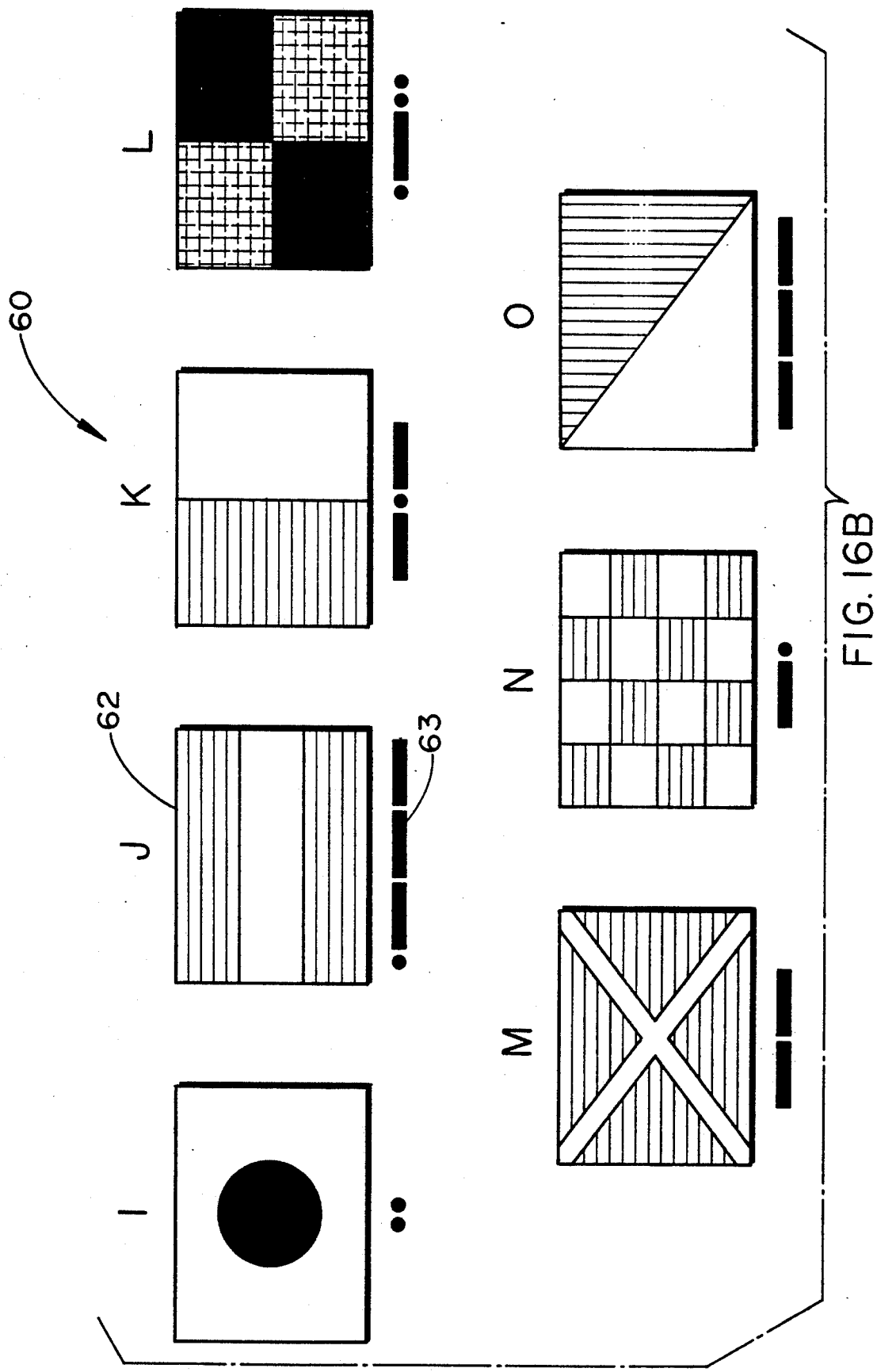
Figure 16C:
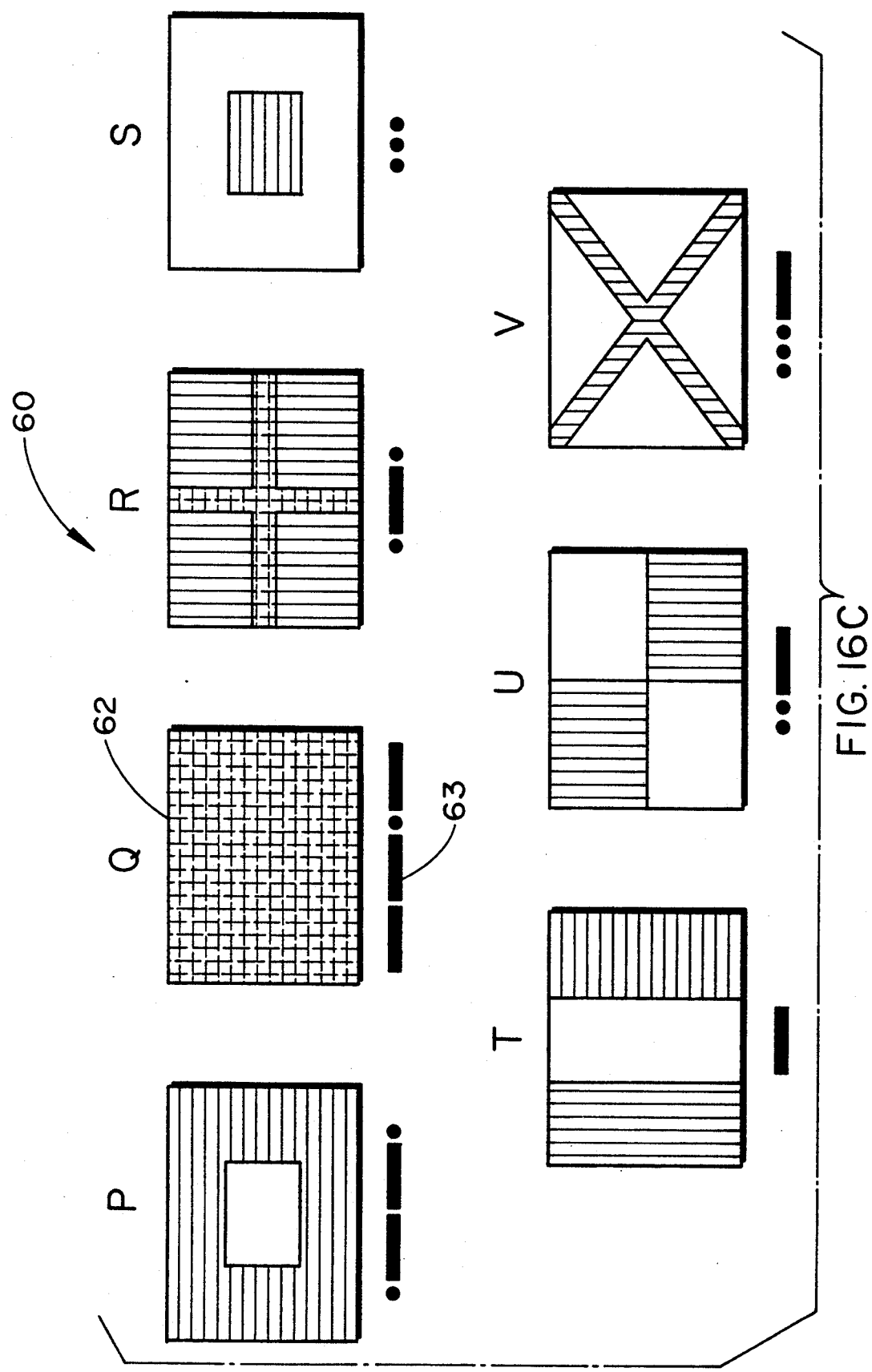
Figure 16D:
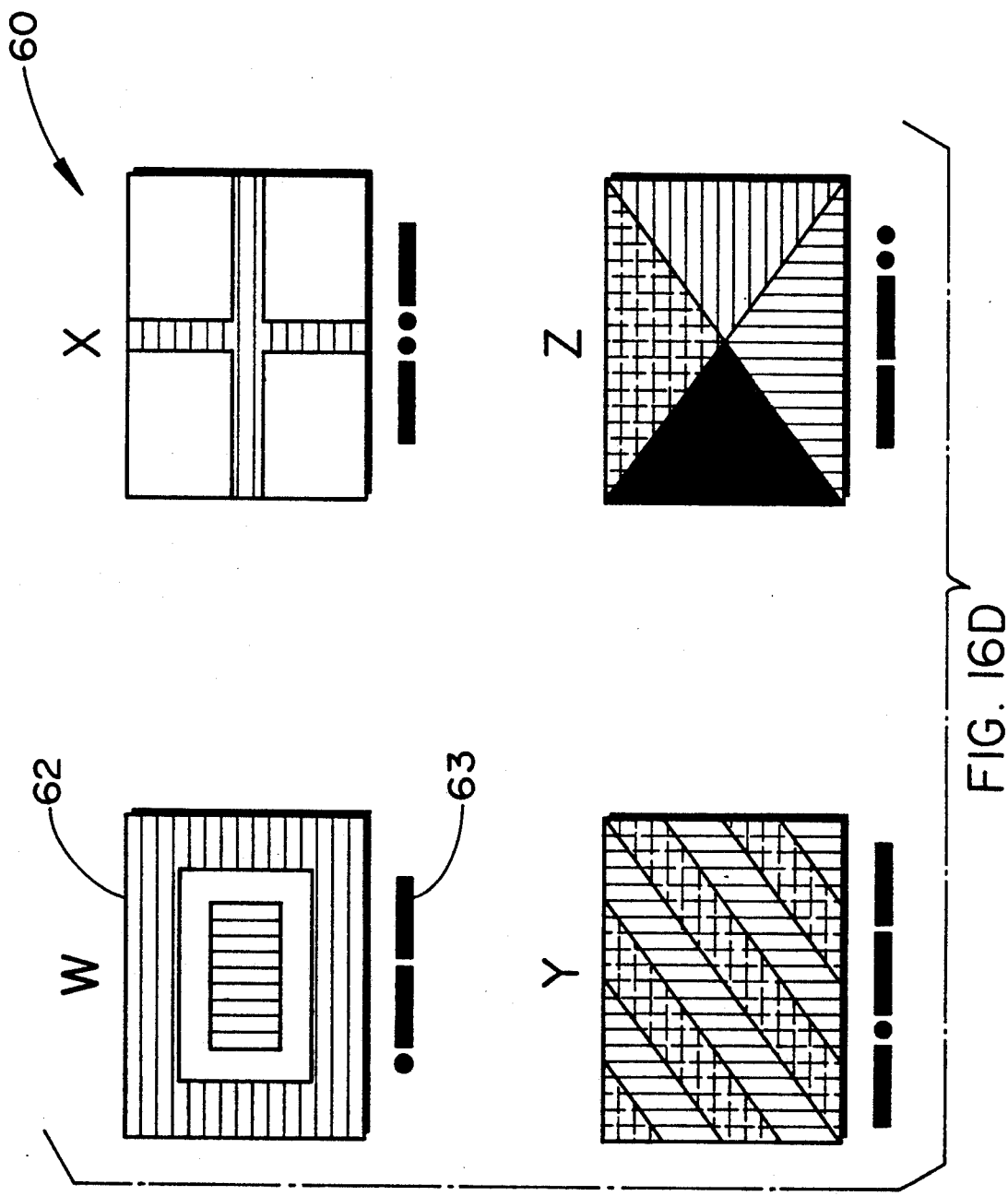

In a further embodiment of the card game, a set, preferably having fifty (50) cards, is provided. Each card 50 has a first side 51 and a second side 52. The first side 51 of each card 50 has marked thereon a letter of the alphabet. The set of cards is further comprised of two groups, each group having twenty-five (25) cards therein. The first group of cards has marked on the first side 51 thereof, a respective letter of the alphabet which indicate the letters A through Y. One letter of the alphabet is marked on each card of the group although a plurality of the same letter may be marked in any respective card of the group. Thus, as in FIGS. 15A-15B, the letter "B" is marked two times in the center portion of the length of the card 50, one marking being rotated 180° from the other marking so that a player may easily read the letter irrespective of the manner in which the card is held. Also, the letter "B" is also marked in the corners of the card. Furthermore, the first group of cards also has marked thereon a first indicia means 55 to indicate the letter succeeding the letter marked on the first side 51 of the respective card 50. As shown in FIG. 15B the first indicia means 55 is "AFTER" although other indicia means conveying the same indication could be used as would be known to persons skilled in the art. The first indicia means 55 directs the player to identify the letter which succeeds the letter of the alphabet marked on the first side 51 of the card 50. As in the example, the letter succeeding "B" is the letter "C".

Similarly, a second group of twenty-five (25) cards has marked thereon a respective letter of the alphabet which indicates the letters B through Z. This second group of cards further has marked thereon second indicia means 56 to indicate the letter preceding the letter marked on the first side 51 of the respective card 50. As shown in FIG. 15A, the second indicia means 56 is "BEFORE" although other indicia means conveying the same indication could be used as would be known to persons skilled in the art. The second indicia means 56 directs the player to identify the letter of the alphabet which precedes the letter of the alphabet marked on the first side 51 of the card 51. As in the example, the letter preceding "B" is the letter "A".

On the cards of both groups, the indicia means 55, 56 may be marked as two identical markings which are oriented inversely to one another (FIGS. 15A and 15B). The players are thereby enabled to read the indicia means when the cards are rotated through 180° and when the players are opposite to one another. The indicia means 55, 56 may be imprinted in a banner or other manner to more clearly denote the indicia means.

If desired, the first indicia means 55 to indicate the succeeding letter and the second indicia means 56 to indicate the preceding letter may be marked in different and distinct first and second colors. The color markings may be used in addition to the word markings.

Also, if desired, the first side 51 of each card 50 may have marked thereon the code word 58 of the phonetic alphabet which corresponds to the letter of the alphabet which is marked on the first side 51 of the respective card (FIGS. 15A and 15B). Typical code words 58 are:

| A - Alpha | J - Juliet | S - Sierra |
|---|---|---|
| B - Bravo | K - Kilo | T - Tango |
| C - Charlie | L - Lima | U - Uniform |
| D - Delta | M - Mike | V - Victor |
| E - Echo | N - November | W - Whiskey |
| F - Foxtrot | O - Oscar | X - X-ray |
| G - Golf | P - Papa | Y - Yankee |
| H - Hotel | Q - Quebec | Z - Zulu |
| I - India | R - Romeo | |

The second side 52 of each card 50, further has marked thereon third indicia means 60 to further direct the players and assist in learning not only the letters of the alphabet but other indicators which are associated with, or used as alternate designators for, the respective letters of the alphabet (FIGS. 16A-16D and 17).

In one embodiment, the third indicia means is a number 61 which corresponds with the numerical sequence in alphabetical order of the letter of the alphabet marked on the first side 51 of the respective card 50. For example, the card 50 having the letter "A" marked on the first side 51 has a numeral "1" marked on the second side 52. The card 50 having the letter "Z" marked on the first side 51, has a numeral "26" marked on the second side 52. The cards 50 having the letter "L" and the first indicia means 55 "AFTER" marked on the first side as well as the card 50 having the letter "L" and the second indicia means 56 "BEFORE" marked on the first side 51 each have the third indicia means 60, the numeral "12" marked on the second side 52 of the card 50. The third indicia means 60 may be marked as two or more individual markings, the markings being oriented inversely to one another to enable the players to read the third indicia means 60 when the cards are rotated through 180° and when the players are on opposite sides of a playing table. Other means of denoting the numerical sequence of the letters of the alphabet may be used.

Figure 17:
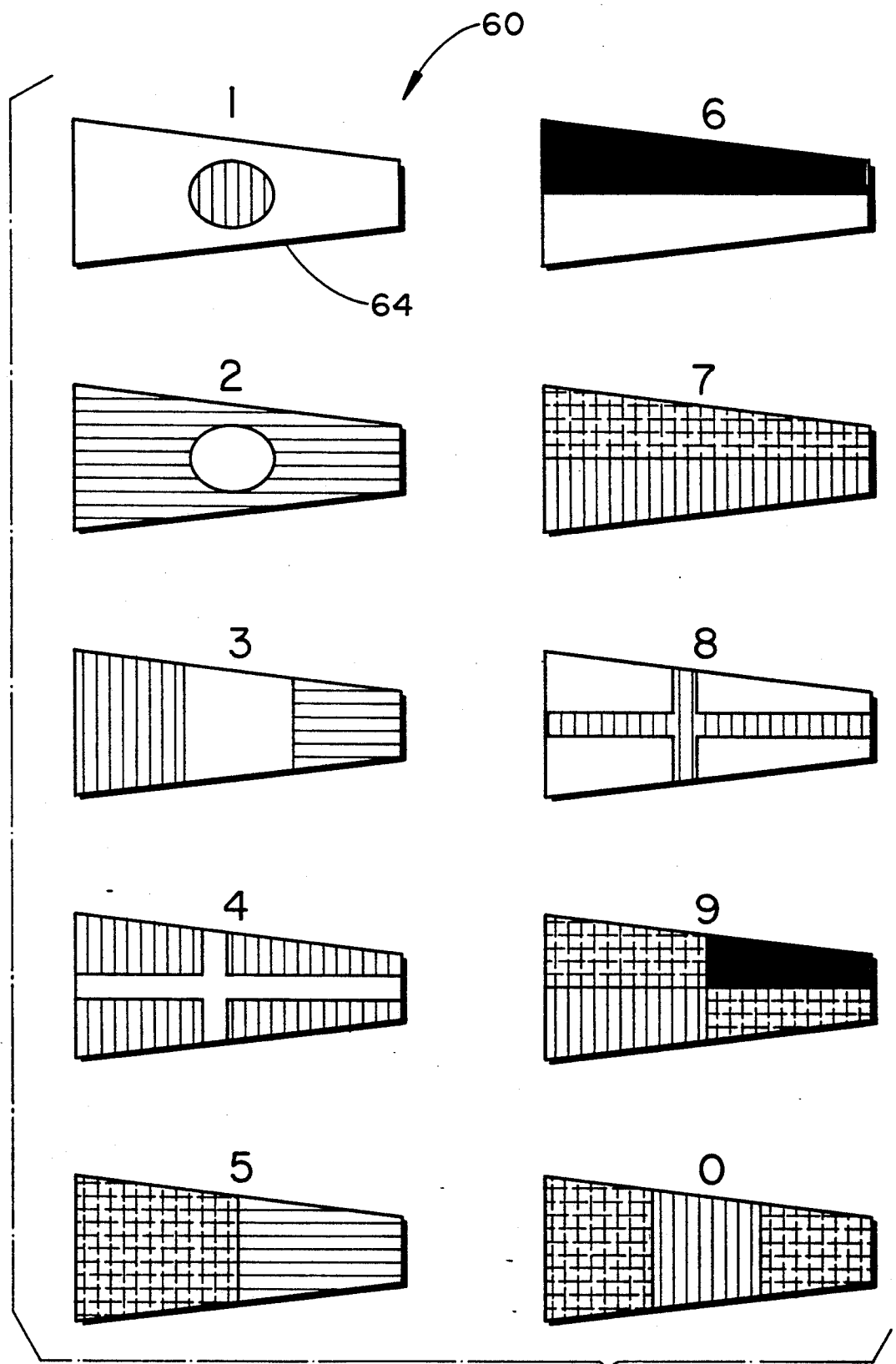
FIG. 17 are the international numeral pennants used as third indicia means.
Figure 18:
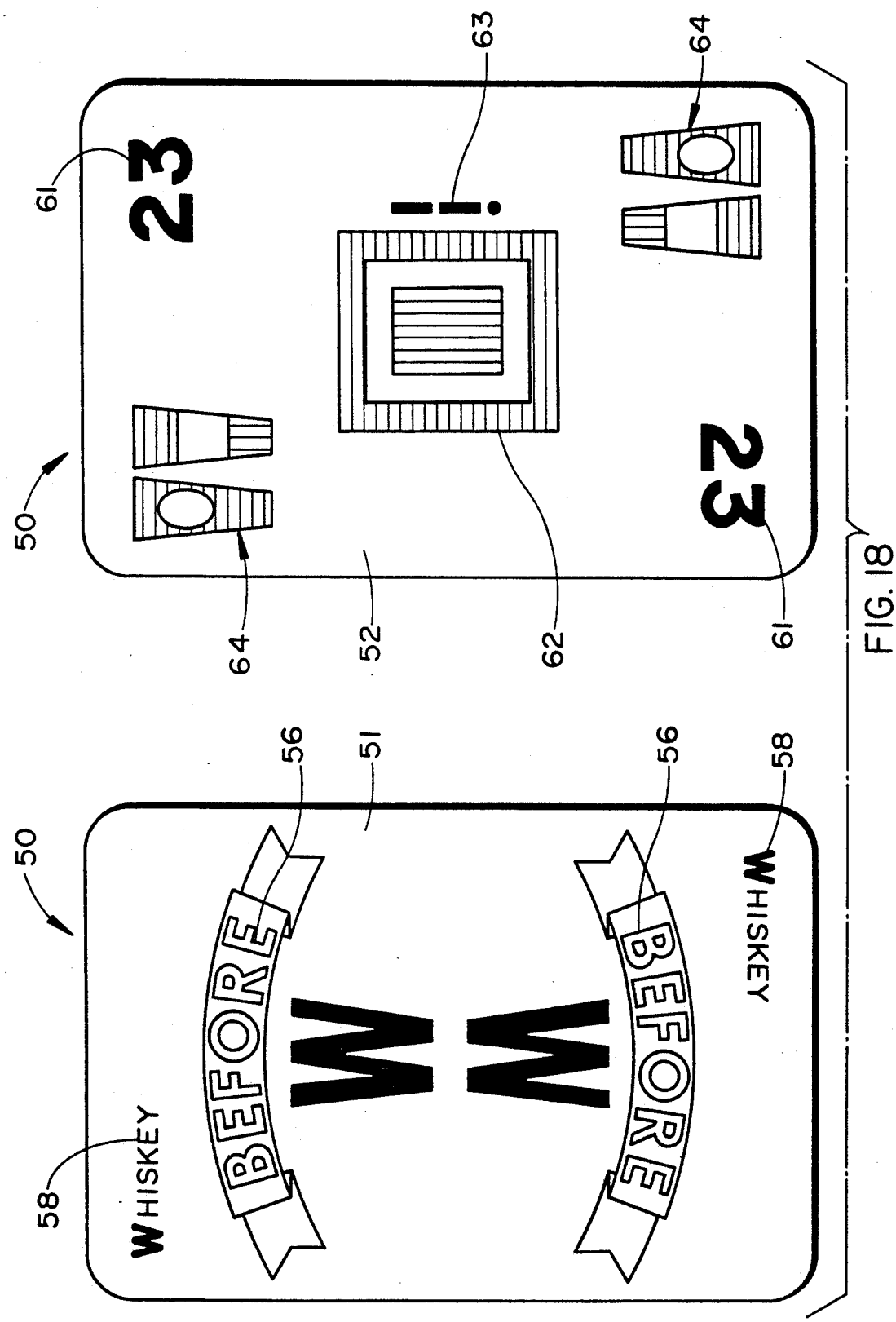
FIG. 18 is a plan view of a card of the embodiment of FIG. 15A showing combinations of third indicia means.

The pennants 64 which denote the international numerical code such as used in nautical applications could be marked as the third indicia means 60 in place of, or in addition to, the numerals (FIG. 17). Since the pennants 64 are limited to representing the numerals 0 through 9, to designate letters of the alphabet which are in numerical sequence greater than nine (9), two pennants are used. The pennants are displayed with the tens digit disposed above the units digit. For example, letter "W" is the twenty-third letter of the alphabet. The pennant for two (2) representing twenty (20), the tens value, is disposed above the pennant for three (3) representing the unit value (FIG. 18).

In a second embodiment, the third indicia means 60 may be the flag of the international code of signals 62 corresponding to the respective letter of the alphabet marked on the first side 51 of the respective card 50 (FIGS. 16A–16D). The flags of the international code of signals are disclosed on Plate VII following page 928 of Webster's International Dictionary of the English Language, Second Edition (1951). The appropriate flag may be marked on the second side 52 of the card 50 having a first side 51 marked with the corresponding letter and the first indicia means 55 as well as the card marked with the corresponding letter and the second indicia means 56.

In a third embodiment, the third indicia means 60 marked on the second side 52 of the card 50 may be the Morse code designator 63 corresponding with the letter of the alphabet marked on the first side 51 of the respective card 50 (FIGS. 16A–6D). The Morse code designators are:

| A .-   | J .---  | S ...  |
|--------|---------|--------|
| B -... | K -.-   | T -    |
| C -.-. | L .-..  | U ..-  |
| D -..  | M --    | V ...- |
| E .    | N -.    | W .--  |
| F ..-. | O ---   | X -..- |
| G --.  | P .--.  | Y -.-- |
| H .... | Q --.-  | Z --.. |
| I ..   | R .-.   |        |

If desired, more than one third indicia means 60 may be marked on the second side 52 of any card. Thus, the third indicia means 60 may be the numerical sequence of the letter of the alphabet 61, the pennants 64 denoting the numeral code, the flag of the international code 62 or the Morse code designator 63, either individually or in any combination thereof.

A set of instructions is also provided. The instructions may be marked on a card similar in size to the cards of the game.

Having described the apparatus of the present invention, the method of playing the game is now described.

Preferably, the game is played by two or more players. The optimum number of players is two or four. The players read the instructions to be thoroughly familiar with the method of playing the game. A predetermined number of cards is dealt to each player. The preferred number of cards is seven (7). The cards which are remaining, after each player receives the predetermined number of cards, are placed in a draw stack from which the players may draw during the course of the game. Each card in the draw stack are disposed with the third indicia means 60 visible to the players, i.e. the second side 52 of each card 50 is visible. A first player draws a card from the draw stack of cards. The first player reviews the cards dealt to said player together with the drawn card and identifies cards, if such cards are available, which have sequential letters of the alphabet marked thereon. The sequential cards must also have first indicia means 55 and second indicia means 56 marked thereon to indicate the letters of the alphabet are succeeding and preceding one another. For example, the first player, after drawing from the draw stack has eight cards available in his hand. One card is marked with the letter "C" and has a first indicia means 55 (AFTER) marked thereon. Another card is marked with the letter "D" and has a second indicia means 56 (BEFORE) marked thereon. These two cards are identified by the first player as being matching. However, if the one card marked with the letter "C" was marked with a second indicia means 56 (BEFORE), the card marked with the letter "D" was further marked with a first indicia means 55 (AFTER), the cards could not be identified as being matching. If the first player has identified any two cards as indicated above (i.e. matching), the first player places the identified cards on the playing surface into two respective stacks wherein the letters marked on the cards, and the first indicia means 55 and the second indicia means 56, are visible to all players. Thus all players can affirm that the first player has correctly identified the letters of the alphabet as directed on the cards. If the first player does not have a matching pair of cards as directed above, the first player does not place any cards into stacks and the first player then has one more card available in said player's hand (a total of eight (8) cards if the initial deal was seven (7) cards). The first player then selects and discards one card from those cards available in said player's hand. Thus the first player then has a total of seven (7) cards available if said player has not matched any cards. Alternately, the first player then has a total of five (5) cards available if said player has matched one pair of cards having sequential letters of the alphabet and proper first indicia 55 means and second indicia means 56. The discarded card is placed in a discard stack wherein the third indicia means 60 is visible to all players (i.e., the second side 52 of the discarded card is visible).

A second player then draws a card from either the draw stack or the discard stack, as selected by the second player. The visible third indicia means 60 on the cards in both the discard stack and the draw stack are considered by the second player in deciding whether to select the card from the draw stack or the discard stack. If the second player has learned the relationship between the third indicia means 60 on the second side 52 of the respective card and the respective letter of the alphabet on first side 51 of the same respective card, the second player will know whether the card to be drawn will more likely match a card held by the second player. The second player will not know whether the card about to be drawn is further marked with a first indicia means 55 or a second indicia means 56, but the second player will know the letter of the alphabet. Thus, even if the second player selects a card having the letter of the alphabet which is needed by the second player, there is still the possibility that the first or second indicia means may not match with the card held by the second player. This aspect of the game enhances the excitement and interest in the game. After drawing a card, the second player reviews the cards dealt to said player together with the drawn card, and identifies cards, if such cards are available which have sequential letters of the alphabet marked thereon. The sequential cards must also have the first indicia means 55 and the second indicia means 56 marked thereon to indicate the letters of the alphabet are succeeding and preceding one another as discussed above with respect to the first player. If the second player has identified any two matching cards, the second player places the identified cards on the playing surface in two respective stacks wherein the letters marked on the cards and the first indicia means 55 and the second indicia means 56 are visible to all players. If the second player does not have a matching pair of cards as directed above, the second player does not place any cards into stacks. The second payer then selects and discards one card from those cards available in said player's hand. The discarded card is placed in a discard stack wherein the third indicia means 60 is visible to all players.

The players, in sequence, repeat the above drawing and identifying steps. The game continues until a player has identified all of the cards available in said player's hand, all of said player's cards are displayed in the respective stacks and said player no longer has any cards available in said player's hand. The player first identifying all available cards is determined to be the winner.

By use of the above embodiments of the present invention, persons may become more familiar with the letters of the alphabet and the sequence of the letters. The players of the game are assisted in learning the preceding and succeeding letters of any selected letter. Further, by use of the third indicia means, the players may associate a specific letter with its numerical position in the sequence of letters, the flag of the international code which corresponds with the specific letter and/or the Morse code designator which corresponds with the specific letter. The players also learn the members of the third indicia means. The learning procedure is accomplished in the format of an entertaining game.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A teaching and learning game of cards to be used by at least two players to learn the alphabetical sequence of letters of the alphabet comprising: a set of cards, each card having a first side and a second side, the first side of each card having marked thereon a letter of the alphabet, the first side of a first group of said cards having marked thereon a respective letter of the alphabet indicating the letters A through Y and further having marked thereon first indicia means to indicate the succeeding letter such that the players are directed to identify the letter of the alphabet which succeeds the letter marked on the first side of said card, the first side of a second group of said cards having marked thereon a respective letter of the alphabet indicating the letters B through Z and further having marked thereon second indicia means to indicate the preceding letter such that players are directed to identify the letter of the alphabet which precedes the letter marked on the first side of said card, the second side of each card further having marked thereon third indicia means associated with the respective letters of the alphabet, a set of instructions for the use of the cards; such that the players may compete to be the first player to properly identify the letter of the alphabet as directed by indicia means marked on the selected card.

2. The game of claim 1, wherein the second indicia means for the preceding letter is the notation "before" and the first indicia means for the succeeding letter is the notation "after".

3. The indicia means of claim 2 further comprising the indicia means being marked as two identical markings, the markings being oriented inversely to one another to enable the players to read the indicia mans when the cards are rotated through 180°.

4. The game of claim 1, wherein the first indicia means for the succeeding letter is a first color and the second indicia means for the preceding letter is a second color.

5. The game of cards of claim 1, further comprising the third indicia means being a number, each number corresponding with the numerical sequence in alphabetical order of the letter of the alphabet marked on the first side of the respective card.

6. The third indicia means of claim 5, further comprising the third indicia means being marked as two identical markings, the markings being oriented inversely to one another to enable the players to read the indicia means when the cards are rotated through 180°.

7. The game of cards of claim 1, further comprising the third indicia means being a Morse code designator, the Morse code designator corresponding with the letter of the alphabet marked on the first side of the respective card.

8. The game of cards of claim 1, further comprising the third indicia means being the marking of a flag of the international code of signals, said flag corresponding with the letter of the alphabet marked on the first side of the respective card.

9. The game of cards of claim 1, further comprising the third indicia means being a marking of at least one international numeral pennant, said at least one pennant corresponding with the numerical sequence in alphabetical order of the letter of the alphabet marked on the first side of the respective card.

10. The game of cards of claim 1, wherein the set of instructions is a card.

11. The game of cards of claim 1, further comprising the first side of each card having marked thereon the code word of the phonetic alphabet corresponding to the letter of the alphabet marked on the first side of each respective card.

12. The game of cards of claim 1, wherein each player draws a predetermined number of cards, the players competing to identify the letter of the alphabet marked on the first side of each respective card utilizing the third indicia means marked on the second side of the respective cards, the player first correctly identifying the predetermined number of cards as directed by the indicia means marked thereon being the winner.

13. A teaching and learning game to be used by at least one player to learn the alphabetical sequence of letters of the alphabet comprising: a set of instructions; means for displaying a selected letter of the alphabet; means for displaying a first indicia means to indicate to the at least one player to identify the letter of the alphabet succeeding said selected letter of the alphabet, said first indicia means being displayed simultaneously with said selected letter of the alphabet; means for displaying a second indicia means to indicate to the at least one player to identify the letter of the alphabet preceding said letter of the alphabet, said second indicia means being displayed simultaneously with said selected letter of the alphabet and exclusively of the first indicia means; means for displaying a third indicia means to assist the at least one player to identify the selected letter of the alphabet, said third indicia means being a designator which corresponds to the selected letter of the alphabet.

14. The game of claim 13, further comprising a plurality of cards, wherein each card has marked thereon the selected letter of the alphabet and selected indicia means.

15. The game of claim 14, wherein each card has a first side and a second side, the selected letter of the alphabet and the first indicia means being marked on the first side of the card and the third indicia means being marked on the second side of the card.

16. The game of claim 14, wherein each card has a first side and a second side, the selected letter of the alphabet and the second indicia means being marked on the first side of the card and the third indicia means being marked on the second side of the card.

17. The game of claim 13, wherein the second indicia means for the preceding letter is the notation "before" and the first indicia means for the succeeding letter is the notation "after".

18. The game of claim 13, wherein the third indicia means is a number corresponding with the numerical sequence in alphabetical order of the selected letter of the alphabet.

19. The game of claim 13, wherein the third indicia means is a marking of at least one international numeral pennant, said at least one pennant corresponding with the numerical sequence in alphabetical order of the selected letter of the alphabet.

20. The game of claim 13, wherein the third indicia means is a Morse code designator corresponding with the selected letter of the alphabet.

21. The game of claim 13, wherein the third indicia means is a marking of the international code flag corresponding with the selected letter of the alphabet.

22. A method of playing a game for at least two players to learn the alphabetical sequence of the letters of the alphabet, said game having a set of instructions, a set of fifty cards, each card having a first side and a second side, the first side of each card having marked thereon a letter of the alphabet, the first side of a first group of twenty-five of said cards having marked thereon a respective letter of the alphabet indicating the letters A through Y and further having marked thereon first indicia means to indicate the succeeding letter such that the players are directed to identify the letter of the alphabet which succeeds the letter marked on the first side of said card, the first side of a second group of twenty-five of said cards having marked thereon a respective letter of the alphabet indicating the letters B through Z and further having marked thereon second indicia means to indicate the preceding letter such that players are directed to identify the letter of the alphabet which precedes the letter marked on the first side of said card, the second side of each card further having marked thereon third indicia means associated with the respective letters of the alphabet, said method comprising the steps of: reading the set of instructions, dealing a predetermined number of cards to each player, the cards not being dealt being a remaining number of cards, placing the remaining number of cards in a draw stack from which the players may draw, the cards being disposed with the third indicia means visible to the players, a first player drawing one card from the draw stack of cards, the first player reviewing the cards dealt to said player and the drawn card and identifying cards, if available, having sequential letters of the alphabet marked thereon and the cards further having first and second indicia means marked thereon to indicate the letters of the alphabet which are succeeding and preceding one another, placing said identified cards in two respective stacks wherein the letters marked on said cards and the first and second indicia means are visible to the players, the first player discarding one of said dealt cards into a discard stack wherein the third indicia means is visible to the players, a second player drawing a card from either the discard stack or the draw stack as selected by the second player based on the third indicia visible to the players, the second player identifying cards, if available, having sequential letters of the alphabet marked thereon and the cards further having first and second indicia means marked thereon to indicate the letters of the alphabet which are succeeding and preceding one another, the second player placing said identified cards in two respective stacks wherein the letters marked on said cards and the first and second indicia means are visible to the players, the second player discarding one of said dealt cards into a discard stack wherein the third indicia means is visible to the players, the players, in sequence, repeating the drawing and identifying steps, the player first identifying all dealt cards, and placing said identified cards in the respective two stacks is determined to be the winner.

* * * * *